(12) United States Patent
Li

(10) Patent No.: US 12,504,299 B2
(45) Date of Patent: Dec. 23, 2025

(54) FAULT DETECTION, CONTAINMENT, ISOLATION, AND RESPONSE ARCHITECTURE FOR A POSITION, NAVIGATION, AND TIMING (PNT) SYSTEM

(71) Applicant: The Boeing Company, Chicago, IL (US)

(72) Inventor: Rongsheng Li, Hacienda Heights, CA (US)

(73) Assignee: The Boeing Company, Arlington, VA (US)

( * ) Notice: Subject to any disclaimer, the term of this patent is extended or adjusted under 35 U.S.C. 154(b) by 708 days.

(21) Appl. No.: 17/363,319

(22) Filed: Jun. 30, 2021

(65) Prior Publication Data

US 2022/0018681 A1 Jan. 20, 2022

Related U.S. Application Data

(60) Provisional application No. 63/052,066, filed on Jul. 15, 2020.

(51) Int. Cl.
*G01C 25/00* (2006.01)
*G01C 21/16* (2006.01)
(Continued)

(52) U.S. Cl.
CPC ........... *G01C 25/00* (2013.01); *G01C 21/165* (2013.01); *G01C 21/188* (2020.08); *G01C 21/20* (2013.01);
(Continued)

(58) Field of Classification Search
CPC .... G01C 25/00; G01C 21/165; G01C 21/188; G01C 21/20; G01S 19/20; G01S 19/47;
(Continued)

(56) References Cited

U.S. PATENT DOCUMENTS 6,570,531 B1 * 5/2003 Stratton .................. G01S 19/15
342/357.53
2004/0058645 A1 3/2004 Brenner
(Continued)

FOREIGN PATENT DOCUMENTS

CN 102597701 A 7/2012
EP 2488827 B1 9/2016

OTHER PUBLICATIONS

Laurian Dinca et al., Fault detection and identification in dynamic systems with noisy data and parameter/modeling uncertainties, 65 Reliability Engineering & System Safety 1, https://doi.org/10.1016/S0951-8320(98)00077-5 (Year: 1999).*
(Continued)

Primary Examiner — Justin R. Blaufeld
(74) Attorney, Agent, or Firm — Kolitch Romano Dascenzo Gates LLC

(57) ABSTRACT

A PNT system for a user includes a plurality of sensors configured to collect measurements, where the sensors are grouped into a plurality of subsets of sensors. The PNT system individually compares a measured value collected by each of the plurality of sensors with a corresponding threshold value. The PNT system determines a potential fault condition for a particular sensor exists when the measured value exceeds the corresponding threshold value. In response to detecting the potential fault condition, the PNT system contains the potential fault condition by determining a replacement value. In response to determining a number of times that the potential fault condition is detected exceeds a predetermined value, the PNT system determines a confirmed fault condition with the particular sensor and re-groups the plurality of subsets of sensors. The PNT system proceeds to a second level of fault detection for determining a plurality of individual navigation solutions.

22 Claims, 8 Drawing Sheets

(51) Int. Cl.
*G01C 21/20* (2006.01)
*G01S 19/20* (2010.01)
*G01S 19/47* (2010.01)
*B60W 50/02* (2012.01)
*B60W 50/029* (2012.01)

(52) U.S. Cl.
CPC .............. *G01S 19/20* (2013.01); *G01S 19/47* (2013.01); *B60W 2050/0215* (2013.01); *B60W 50/0225* (2013.01); *B60W 50/029* (2013.01)

(58) Field of Classification Search
CPC ........... B60W 50/0225; B60W 50/029; B60W 2050/0215
See application file for complete search history.

(56) References Cited

U.S. PATENT DOCUMENTS

| | | | | |
|---|---|---|---|---|
| 2008/0270027 A1* | 10/2008 | Stecko | ................... | B64D 39/00 701/476 |
| 2011/0090116 A1* | 4/2011 | Hatch | ..................... | G01S 19/40 342/357.59 |
| 2012/0013505 A1 | 1/2012 | Vourc'H et al. | | |
| 2012/0265376 A1* | 10/2012 | Fleiger-Holmes | ...... | G01S 19/20 701/16 |
| 2017/0070971 A1 | 3/2017 | Wietfeldt et al. | | |
| 2017/0297562 A1* | 10/2017 | Chen | .................... | B60W 50/029 |
| 2017/0297584 A1* | 10/2017 | Chen | .................... | B60T 8/1755 |
| 2017/0350973 A1* | 12/2017 | Dunik | ................... | G01S 13/882 |
| 2018/0349235 A1* | 12/2018 | Freydel | ................. | G06F 11/182 |
| 2021/0293975 A1* | 9/2021 | Kana | ....................... | G01S 19/20 |

OTHER PUBLICATIONS

Rife, Jason. "Collaboration-Enhanced Receiver Integrity Monitoring (CERIM)," Oct. 5-11, 2011, 14th International IEEE Conferenced on Intelligent Transportation Systems, Oct. 2011, pp. 13-18, IEEE, Washington, DC, USA.

European Patent Office. Extended European Search Report for EP Application No. 21180827.4, mailed Feb. 9, 2022, pp. 1-10.

European Patent Office. Extended European Search Report for EP Application No. 22207253.0, mailed Feb. 1, 2023, pp. 1-9.

European Patent Office. Office Action for EP Application No. 21180827.4, mailed Jan. 24, 2023, pp. 1-8.

China Intellectual Property Office, Notice of First Office action issued in related application CN202110762500.9, issued Jun. 13, 2025.

* cited by examiner

FAULT DETECTION, CONTAINMENT, ISOLATION, AND RESPONSE ARCHITECTURE FOR A POSITION, NAVIGATION, AND TIMING (PNT) SYSTEM

CROSS-REFERENCE TO RELATED APPLICATION

This application claims priority to U.S. Provisional Application No. 63/052,066, filed Jul. 15, 2020. The contents of the application are incorporated herein by reference in its entirety.

INTRODUCTION

The present disclosure relates to a position, navigation, and timing (PNT) system. More specifically, the present disclosure is directed towards a fault detection, containment, isolation, and response architecture for a plurality of sensors that are part of a PNT system.

BACKGROUND

A position, navigation, and timing (PNT) system may determine a navigation and time solution based on measurements from an inertial measurement unit. However, navigation errors caused by inertial measurement units errors grow over time, as the result of integrations within the inertial navigation algorithms. As a result, PNT systems may blend the navigational solution, which is based on measurements from the inertial navigation unit, with data collected from global positioning systems (GPS) and global navigation satellite systems (GNSS). However, GPS and other GNSS signals are low in power, thereby making them susceptible to disruption by even very low power interferences. For example, GPS denial may be caused by unintentional interference or intentional interference and is referred to as jamming. As a result, an assured PNT (A-PNT) system may be provided instead, as A-PNT systems are capable of providing trusted PNT information while operating in conditions with potentially limited, impeded, or denied GPS/GNSS. A-PNT systems are required in military applications as well as some commercial applications. Finally, A-PNT systems provide the availability, access, and integrity of a PNT solution under various threat and fault conditions.

SUMMARY

According to several aspects, a position, navigation, and timing (PNT) system for a user is disclosed. The PNT system includes a plurality of sensors configured to collect measurements related to the user, where the plurality of sensors are grouped into a plurality of subsets of sensors. The PNT system also includes one or more processors in electronic communication with the plurality of sensors and a memory coupled to the one or more processors. The memory stores data into one or more databases and program code that, when executed by the one or more processors, causes the PNT system to individually compare a measured value collected by each of the plurality of sensors with a corresponding threshold value, where the measured values are compared individually at a first level of fault detection. The PNT system also determines a potential fault condition for a particular sensor exists when the measured value exceeds the corresponding threshold value. In response to detecting the potential fault condition, the PNT system contains the potential fault condition by determining a replacement value. The PNT system counts a number of times that the potential fault condition is detected. The PNT system also compares the number of times that the potential fault condition is detected with a predetermined value. In response to determining the number of times that the potential fault condition is detected exceeds the predetermined value, the PNT system determines a confirmed fault condition with the particular sensor. In response to determining the confirmed fault condition for the particular sensor, the PNT system re-groups the plurality of subsets of sensors. The PNT system proceeds to a second level of fault detection, where the second level of fault detection includes determining a plurality of individual navigation solutions corresponding to each of the plurality of subsets of sensors and each individual navigation solution is based on a corresponding subset of sensors.

In another aspect, a method for managing a fault condition for a PNT system is disclosed. The method includes individually comparing a measured value collected by each of a plurality of sensors with a corresponding threshold value, wherein the measured values are compared individually at a first level of fault detection. The plurality of sensors are grouped into a plurality of subsets of sensors. The method includes determining a potential fault condition for a particular sensor exists when the measured value exceeds the corresponding threshold value. In response to detecting the potential fault condition, the method contains the potential fault condition by determining a replacement value. The method also includes counting a number of times that the potential fault condition is detected and comparing the number of times that the potential fault condition is detected with a predetermined value. In response to determining the number of times that the potential fault condition is detected exceeds the predetermined value, the method determines a confirmed fault condition with the particular sensor. In response to determining the confirmed fault condition for the particular sensor, the method re-groups the plurality of subsets of sensors. Finally, the method includes proceeding to a second level of fault detection, where the second level of fault detection includes determining a plurality of individual navigation solutions corresponding to each of the plurality of subsets of sensors and each individual navigation solution is based on a corresponding subset of sensors.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a fault detection, containment, isolation, and response architecture for a plurality of sensors that are part of a position, navigation, and timing (PNT) system for a user. Specifically, a fault management architecture is configured to detect, contain, isolate, and respond to fault conditions in one or more of the sensors. For purposes of the present disclosure, a fault condition represents when one or more of the sensors output an incorrect value, when the one or more sensors output no value, and processing and software errors. The fault management architecture identifies the particular sensor creating the fault condition and isolates the particular sensor to prevent the fault from propagating though the PNT system. The fault management architecture also determines if a particular external aiding source, such as a satellite that is part of a global navigation satellite systems (GNSS) system that is in wireless communication with the PNT system, has been compromised. A compromised satellite indicates an external fault, that the signals transmitted by the satellite have been jammed, or that signals transmitted by the satellite have been spoofed. In response to determining one or more satellites have been compromised, the fault management architecture performs one or more corrective actions.

The following description is merely exemplary in nature and is not intended to limit the present disclosure, application, or uses.

Figure 1:
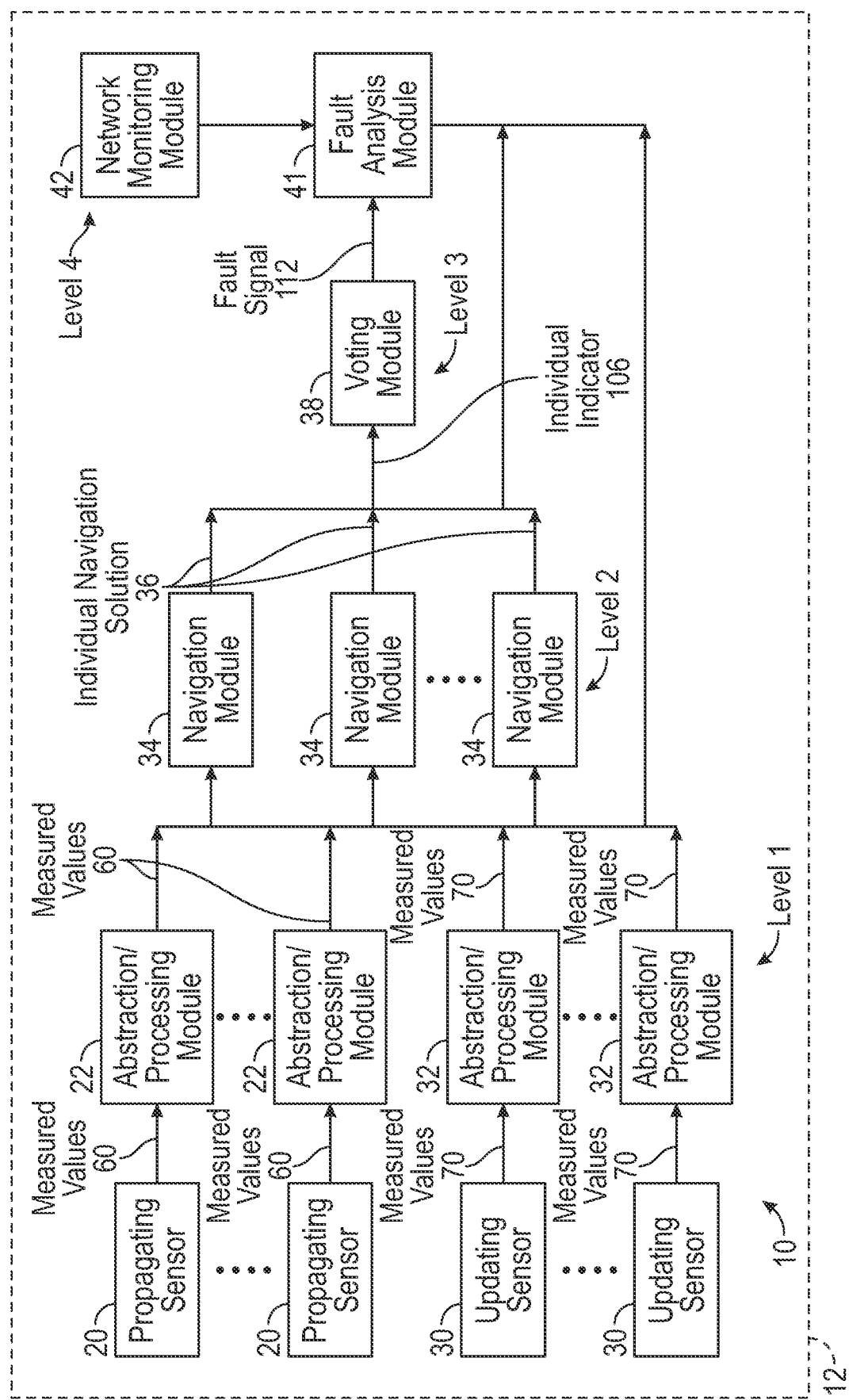
FIG. 1 is a schematic diagram of a fault detection, containment, isolation, and response architecture for the disclosed position, navigation, and timing (PNT) system for a user, according to an exemplary embodiment.
Figure 5:
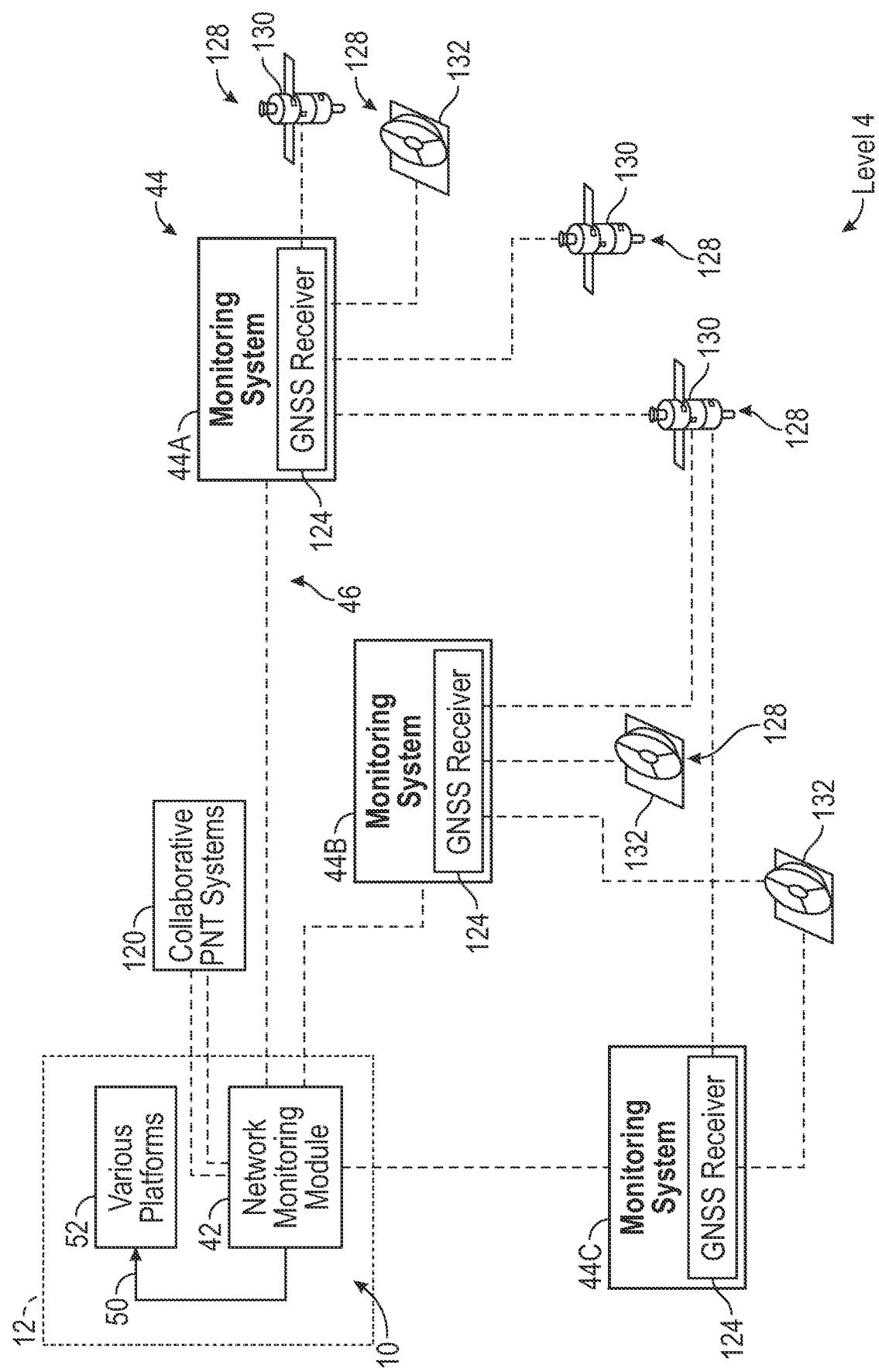
FIG. 5 is a schematic diagram of a fourth level of fault detection, according to an exemplary embodiment.

Referring to FIG. 1, an exemplary position, navigation, and timing (PNT) system 10 for a user 12 is illustrated. The PNT system 10 includes a plurality of sensors 20, 30 configured to collect measurements related to the user 12. Specifically, the plurality of sensors 20, 30 are configured to collect measurements related to a position, a velocity, an attitude, or time of the user 12. The disclosed PNT system 10 includes a plurality of propagating sensors 20 that are each in electronic communication with a corresponding sensor abstraction/processing module 22 and a plurality of updating sensors 30 that are each in electronic communication with a corresponding sensor abstraction/processing module 32. The PNT system 10 further includes a plurality of navigation modules 34 that are in electronic communication with the sensor abstraction/processing modules 22, 32. As explained below, the plurality of navigation modules 34 each determine an individual navigation solution 36 for the user 12 based on a corresponding subset 28 (shown in FIG. 3) of the sensors 20, 30 that are part of the PNT system 10. Each individual navigation solution 36 indicates a position, a velocity, and an attitude of the user 12. The PNT system 10 also includes a voting module 38, a fault analysis module 41, and a network monitoring module 42. As seen in FIG. 5, the network monitoring module 42 is in wireless communication with one or more monitoring systems 44 by a communication network 46. As explained below, the monitoring systems 44 are configured to determine the integrity of global navigation satellite systems (GNSS) signals and augmentation signals.

Referring to FIG. 1, in one embodiment the user 12 is an individual, such as a soldier carrying a corresponding PNT system 10. In another embodiment, the user 12 is a vehicle such as, but not limited to, an automobile, an aircraft, an unmanned aerial vehicle (UAV), a helicopter, a missile, a marine vehicle, an unmanned underwater vehicle (UUV), or an unmanned ground vehicle (UGV). The PNT system 10 includes a fault management architecture that is configured to detect, contain, isolate, and respond to a fault condition within the PNT system 10. The fault condition occurs with the one or more sensors 20, 30. Alternatively, the PNT system 10 detects an external fault condition with respect to resources sent over the communication network 46 (FIG. 1). Specifically, the PNT system 10 includes four levels of fault management, namely a first level (level 1), a second level (level 2), a third level (level 3), and fourth level (level 4), where the fourth level (level 4) monitors the integrity of GNSS and augmentation systems signal, collects information about the status, availability, and integrity of other PNT resources, and provides network level assistance to the PNT system 10 with respect to fault management related decisions and management of resources sent over the communication network 46.

The PNT system 10 includes an Np number of propagating sensors 20 that are each configured to collect measurements that are used to determine a corresponding propagating solution for the user 12, where Np may be any whole number that is more than one. Some examples of the propagating sensors 20 include, but are not limited to, an inertial measurement unit and a clock for time propagation. The PNT system 10 also includes Nu number of updating sensors 30 that are configured to collect measurements that are used to determine updates, where the updates correct the propagating solutions. Some examples of updating sensors 30 include, but are not limited to, a global positioning systems (GPS), gravity sensors, altimeters, cameras, star-trackers, signal of opportunity receivers, radars, lidars, and magnetometers. The propagating solutions form one or more propagated navigation solutions. The navigation modules 34 combine the updates, which are determined based on the measurements collected from the updating sensors 30, with one of the propagated navigation solutions to determine a corresponding individual navigation solution 36. It is to be appreciated that for purposes of the present disclosure, in one embodiment the propagating sensors 20 are each represented by an information source, such as a mathematical model, instead of an actual physical sensor. Similarly, in an embodiment, the updating sensors 30 are each represented by an information source, such as a mathematical model, instead of a physical sensor.

The plurality of propagating sensors 20 are each configured to collect measured values 60 associated with a change of position, change of velocity, or a change of attitude of the user 12. The propagating sensors 20 each generate a time sequence of measured values 60 that are sent to a corresponding propagating sensor processing/abstraction module 22. Each propagating sensor processing/abstraction module 22 is configured to process and encode the measured values 60 generated by a corresponding propagating sensor 20. The measured values 60 collected by each of the propagating sensors 20 are then sent to one or more navigation modules 34. Similarly, the updating sensors 30 are each configured to collect measured values 70 that are a function of the current position, velocity, attitude, or some combination of the current position, velocity, and attitude of the user 12. Specifically, the updating sensors 30 each generate a time sequence of measured values 70 that are sent to a corresponding updating sensor processing/abstraction module 32. Each updating sensor processing/abstraction module 32 is configured to process and encode the measured values 70 generated by a corresponding updating sensor 30. The measured values 70 collected by each of the updating sensors 30 are then sent to one or more of the navigation modules 34.

The first level (level 1) of fault detection occurs at the individual sensor processing/abstraction modules 22, 32. The individual sensor processing/abstraction modules 22, 32 are each configured to detect a potential fault condition that occurs with a single corresponding sensor 20, 30, contain the potential fault condition, isolate the potential fault condition, and respond to a confirmed fault condition. For purposes of the present disclosure, a fault condition represents when one or more of the sensors 20, 30 output an incorrect value, when the one or more sensors 20, 30 output no value, and processing and software errors. In response to determining a fault condition exists for a particular sensor 20, 30, the sensor processing/abstraction modules 22, 32 determines a corresponding replacement value 160, 170 (FIG. 2) that replaces a corresponding measured value 60, 70. It is to be appreciated that the first level (level 1) of fault detection is performed separately and independently for each individual sensor 20, 30 that is part of the PNT system 10.

Figure 2:
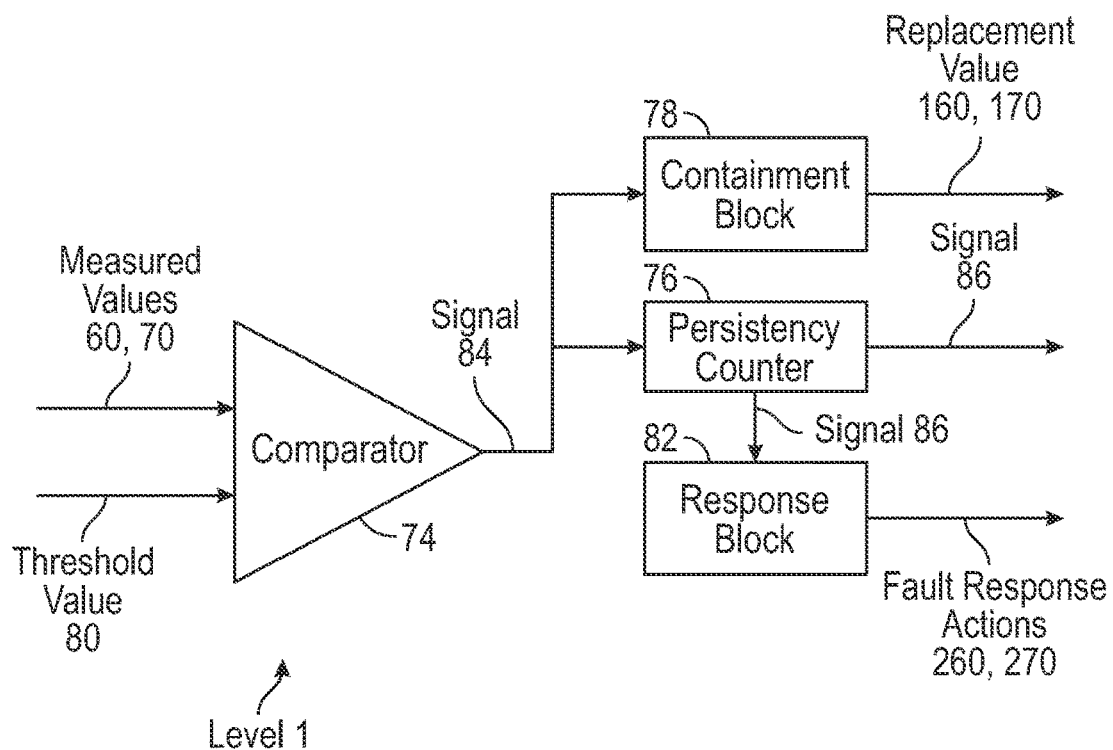
FIG. 2 is a block diagram of a first level of fault detection, containment, isolation, and response for the sensors illustrated in FIG. 1, according to an exemplary embodiment.

FIG. 2 illustrates an exemplary fault detection, containment, isolation, and response block diagram for one of the sensors 20, 30 illustrated in FIG. 1 with respect to level 1 of fault detection. Referring to both FIGS. 1 and 2, each sensor processing/abstraction module 22 includes a corresponding comparator 74, a corresponding persistency counter 76, a corresponding containment block 78, and a corresponding response block 82. Similarly, each sensor processing/abstraction module 32 also includes a corresponding comparator 74, a corresponding persistency counter 76, a corresponding containment block 78, and a corresponding response block 82. In other words, the same fault detection structure is used regardless of the type of sensor being used. The comparator 74 receives the measured values 60 from one of the propagating sensor processing/abstraction modules 22 or, alternatively, the measured values 70 from one of the updating sensor processing/abstraction modules 32. The comparator 74 also receives a threshold value 80 as input, where exceeding the corresponding threshold value 80 indicates a potential fault condition for the particular sensor 20, 30 that is being monitored. For purposes of the disclosure, the potential fault condition is created when the measured value 60, 70 exceeds the corresponding threshold value 80, but an actual fault condition has not been confirmed for the particular sensor 20, 30. The threshold value 80 depends upon the specific variable that the particular sensor 20, 30 is monitoring as well as the particular application. The comparator 74 is configured to compare a corresponding measured value 60 from a particular sensor 20 (or a corresponding measured value 70 from the particular sensor 30) with the corresponding threshold value 80. In response to determining the measured value 60 (or the measured value 70) exceeds the corresponding threshold value 80, the comparator 74 generates a signal 84. The signal 84 indicates the potential fault condition with the particular sensor 20, 30 occurred.

The signal 84 generated by the comparator 74 is sent to the containment block 78. For purposes of the present disclosure, the potential fault condition is contained after the individual sensor processing/abstraction modules 22, 32 detects the potential fault condition, but before the persistency counter 76 determines that the potential fault condition is persistent, and isolates and responds to a confirmed fault condition. The containment block 78 is configured to contain the potential fault condition generated by the particular sensor 20, 30 from propagating throughout the PNT system 10 (FIG. 1) by determining a corresponding replacement value 160, 170. The replacement value 160, 170 takes the place of the measurement value 60, 70 generated by the particular sensor 20, 30 exceeding the corresponding threshold value 80. The replacement value 160 corresponding to one of the propagating sensors 20 is determined based on interpolation, extraction, or prediction using a model. The replacement value 170 corresponding to one of the update sensors 30 is to skip the sample.

It is to be appreciated that containment is performed when a potential fault condition is detected but before the persistence counter 76 has tripped persistently, thereby confirming the potential fault condition. The isolation and response are now described. Continuing to refer to FIG. 2, the signal 84 generated by the comparator 74 is sent to the persistency counter 76 and the response block 82. The persistency counter 76 is configured to count of a number of times that the signal 84 is generated by the comparator 74 and identifies when the potential fault condition becomes persistent. The potential fault condition is persistent when the number of times the signal 84 has been generated exceeds a predetermined value, and the comparator 74 generates a signal 86. The signal 86 provides a confirmation that a confirmed fault condition with respect to the particular sensor 20, 30 occurred. In other words, when the measured value 60, 70 persistently exceeds the predetermined value, then the persistency counter 76 confirms the presence of the potential fault condition with the corresponding sensor 20, 30. The predetermined value is determined based on the specific application and confirms the presence of the potential fault condition with the particular sensor 20, 30. In other words, the persistency counter 76 is configured to count a number of times the signal 84 is generated, where the persistency counter 76 generates the signal 86 when the number of times the corresponding measured value 60, 70 exceeds the corresponding threshold value 80.

The signal 86 is then sent to the response block 82. The response block 82 is configured to determine a fault response action 260, 270 for the particular sensor 20, 30. In one exemplary embodiment, the fault response action 260, 270 represents a reconfiguration of the subset 28 of the sensors 20, 30 used by each of the navigation modules 34. For example, if a redundant sensors exists, then the redundant sensor may be used in the place of a sensor 20, 30 that was taken off-line for being faulty. Alternatively, if no redundant sensor exists, then in another embodiment a combination of sensors 20, 30 that are configured to determine an individual navigation solution are used instead. As mentioned above, the fault response action 260 corresponding to one of the propagating sensors 20 is determined based on interpolation, extraction, or prediction using a model, and the fault response action 270 corresponding to one of the update sensors 30 is to skip the sample.

Figure 3:
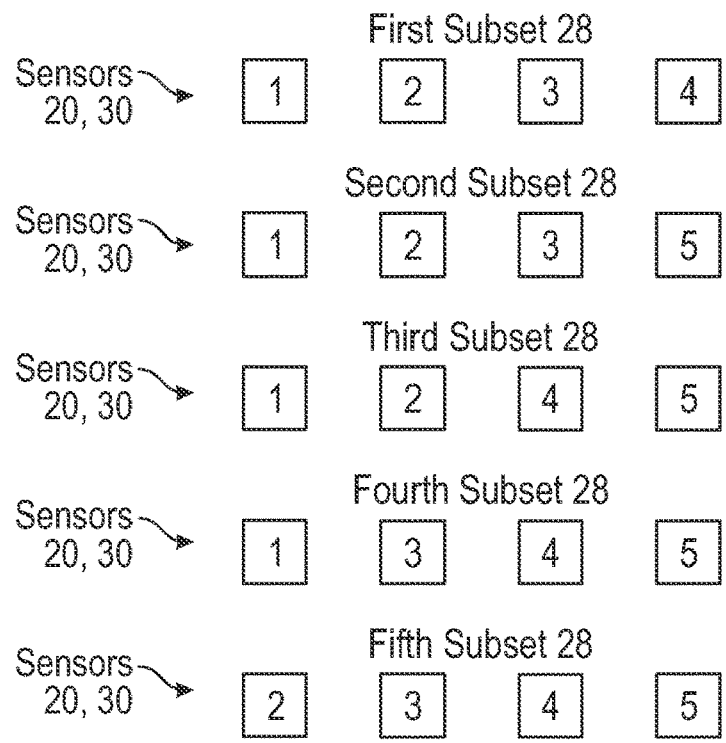
FIG. 3 is a schematic diagram illustrating the sensors shown in FIG. 1 grouped into subsets of sensors, according to an exemplary embodiment.

The second level (level 2) of fault management shall now be described. Referring back to FIG. 1, each navigation module 34 corresponds to one of the subsets 28 of sensors 20, 30 (FIG. 3), and is configured to detect a faulty sensor based on the second level (level 2) of fault detection. Referring to FIGS. 1 and 3, in one embodiment, each subset 28 of sensors 20, 30 excludes a single sensor 20, 30 that is part of the PNT system 10, and each sensor 20, 30 that is part of the PNT system 10 is excluded from one of the subsets 28. In the exemplary embodiment as shown in FIG. 3, the PNT system 10 includes five sensors 20, 30 that are labeled as 1, 2, 3, 4, 5. Accordingly, there are five subsets 28 of sensors 20, 30. The first subset 28 includes sensors 1, 2, 3, and 4, the second subset 28 includes sensors 1, 2, 3, 5, the third subset 28 includes sensors 1, 2, 4, 5, the fourth subset 28 includes sensors 1, 3, 4, 5, and the fifth subset 28 includes sensors 2, 3, 4, 5. In other words, if the PNT system 10 includes an x number of sensors, then each subset 28 of sensors 20, 30 would include an (x–1) number of sensors 20, 30.

Figure 4:
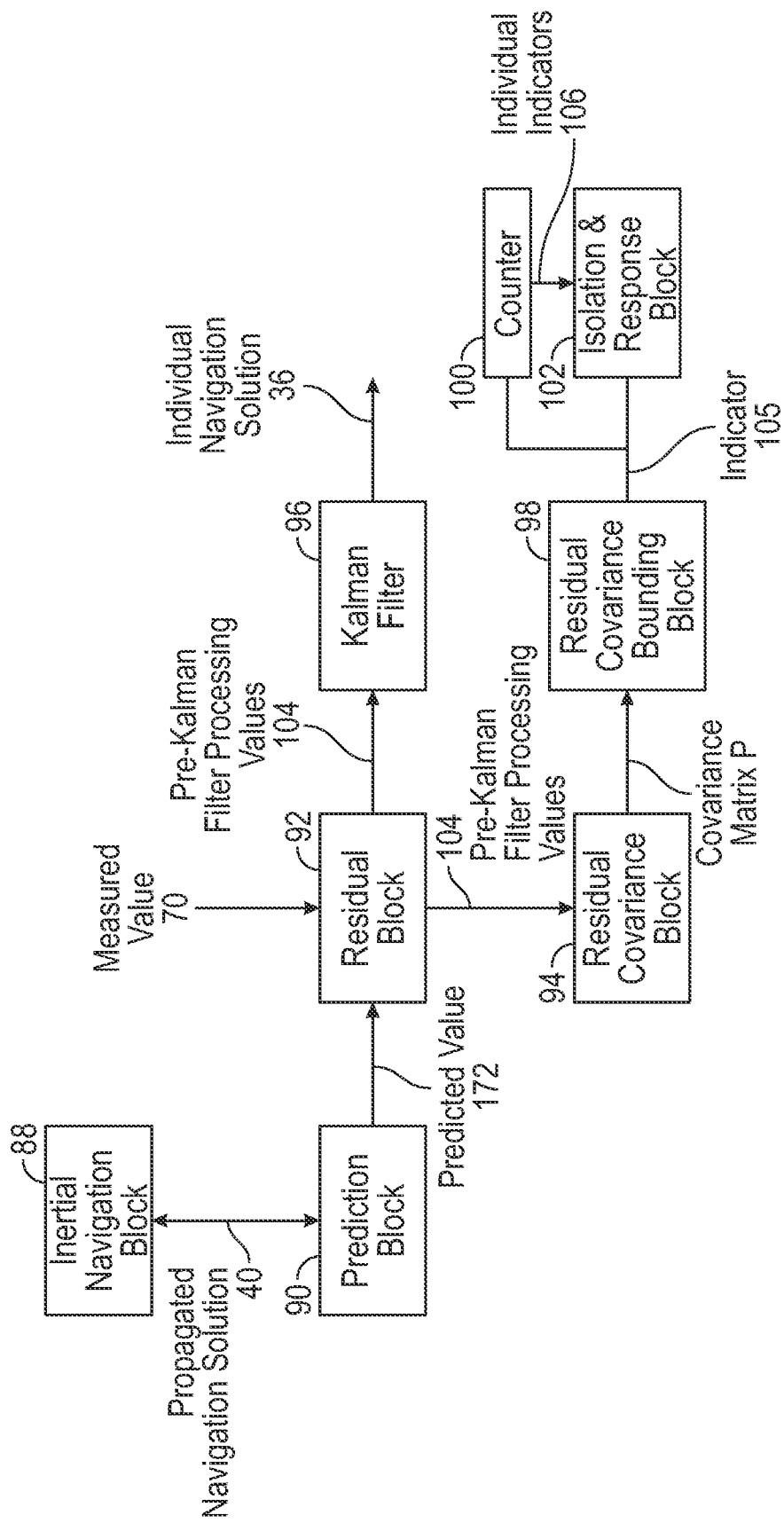
FIG. 4 is a schematic diagram of a second level of fault detection, containment, isolation, and response for the sensors, according to an exemplary embodiment.

Turning back to FIG. 1, the navigation modules 34 are each configured to detect a fault condition for a corresponding subset 28 (FIG. 3) of the sensors 20, 30. Referring now to FIG. 4, an exemplary fault detection, containment, isolation, and response block diagram for one of the navigation modules 34 illustrated in FIG. 1 with respect to the level 2 of fault management. Referring to both FIGS. 1 and 4, each navigation module 34 includes an inertial navigation block 88, a prediction block 90, a residual block 92, residual covariance block 94, a Kalman filter 96, a covariance bounding block 98, a persistency counter 100, and an isolation and response block 102.

The inertial navigation block 88 receives the measured value 60 from a particular propagating sensor 20 and determines a corresponding propagated navigation solution 40 based on the measured value 60. The propagated navigation solution 40 is a time sequence representing a changing location, a changing velocity, and a changing attitude of the user 12 based on the measured value 60 from the corresponding propagating sensor 20. The prediction block 90 receives the propagated navigation solution 40 as input, and predicts a predicted value 172 for an updating sensor 20 based on propagated navigation solution 40 and a mathematical model. The predicted value 172 is determined based on any number of approaches. The prediction block 90 sends predicted value 172 to the residual block 92. The residual block 92 compares the measured value 70 of the updating sensor 30 against the predicted value 172 from the prediction block 90, determines a plurality of pre-Kalman filter processing values for the corresponding subset 28 of sensors 20, 30, where the plurality of pre-Kalman filter processing values include a residual r, a measurement sensitivity matrix H(k), and measurement variance matrix R(k). The residual r represents the difference between the estimated measured value 172 and the measured value 70, the measurement sensitivity matrix H(k) indicates how error in the propagated navigation solution 40 as well as the states in the Kalman filter affect the estimated measured value 172, and the measurement variance matrix R(k) indicates a level of uncertainty or variances of the measured value 70 collected by the corresponding updating sensor 30.

The pre-Kalman filter processing values 104 are sent to the Kalman filter 96. The Kalman filter 96 is configured to determine navigation corrections for the propagated navigation solution 40 and sensor corrections for the corresponding updating sensor 30 based on the pre-Kalman filter processing values 104. The navigation corrections include a position corrections, a velocity correction, and an attitude correction of the user 12, as well as corrections for sensor calibration parameters. The Kalman filter 96 then determines an individual navigation solution 36 by correcting the corresponding propagated navigation solution 40 with the navigation corrections and the sensor corrections.

The pre-Kalman filter processing values 104 are also sent to the residual covariance block 94. The residual covariance block 94 determines an error covariance matrix P that corresponds to the residual r based on the measurement variance matrix R(k) using any number of approaches. The error residual covariance matrix P represents an uncertainty of the residual r. The covariance bound block 98 determines if the residual r is consistent with the remaining data points collected by a respective updating sensor 30. Specifically, the residual covariance block 98 predicts a range of variance values based on the error residual covariance matrix P, and compares the residual r with the range of variance values as predicted by the error residual covariance matrix P. The range of variance values are inversely proportional to the uncertainty of the residual r. Specifically, a smaller variance indicates less uncertainty while a higher variance indicates more uncertainly. The range of variance values of the residual r are expressed in Equations 1 and 2 as:

$$|\text{residual } r_k| < \text{factor}*\sqrt{(\text{variance of residual } r_k)} \qquad \text{Equation 1}$$

$$(\text{residual } r_k)^2 < \text{factor}^2*(\text{variance of residual } r_k) \qquad \text{Equation 2}$$

where k is an index into a residual vector, Equation 1 is equivalent to Equation 2, and the factor represents a confidence factor having a value greater than three. The factor is greater than three because if the residual value r is a Gaussian distribution, then there is a 99.73% probability that the residual r is less than three times the square root of the variance of the residual r. However, the value of the factor may be chosen based on the distribution of the random variables in the PNT system 10 (FIG. 1).

The covariance bound block 98 compares the residual r with a corresponding range of variance values predicted by the error covariance matrix P. In response to determining that the residual r does not fall within the corresponding range of variance values, the residual covariance bound block 98 generates an indicator 105 that is sent to the persistency counter 100, and the isolation and response block 102. In other words, the indicator 105 is generated in response to detecting a fault condition for a particular subset 28 of sensors 20, 30. The residual covariance bound block 98 is configured to stop a yet-to-be or possible fault condition generated by the corresponding sensor 20, 30 from propagating throughout the PNT system 10 (FIG. 1). Accordingly, it is to be appreciated that containment of the fault condition is done as the persistency counter 100 is still running, and the fault condition for a specific subset 28 of sensors 20, 30 has not been declared yet. Specifically, containment of the fault is performed by omitting or skipping the measured values 60, 70 for a particular sample time.

It is to be appreciated that containment is performed when the fault condition is detected but before the persistence counter 100 has tripped persistently, thereby confirming the fault condition. The isolation and response are now described. The persistency counter 100 is configured to keep count of a number of times that the indicator 105 is generated. When the number of times that the indicator 105 has been generated exceeds a preselected value, then an individual indicator 106 is generated. The individual indicator 106 confirms there is a fault condition with one or more of the corresponding subsets 28 (FIG. 3) of the sensors 20, 30 that are part of the PNT system 10.

The individual indicator 106 is sent to the isolation and response block 102. If the isolation and response block 102 determines the specific sensor 20, 30 that is the source of the fault condition, then isolation is performed to determine which sensor 20, 30 caused the fault condition. In an embodiment, the response is to take the faulty sensor 20, 30 offline. However, isolation of a particular sensor 20, 30 may not always be possible at level 2 of fault detection. If the fault condition cannot be isolated or traced back to a particular sensor 20, 30, then the third level (level 3) of fault detection management is performed. That is, in some instances a navigation module 34 is unable to identify the specific faulty sensor 20, 30 that is the source of the fault condition. As explained below, if the navigation module 34 is unable to identify the specific faulty sensor 20, 30, then the third level (level 3) of fault detection is then performed. It is to be appreciated that that level 2 detection, containment, isolation, and response, are performed for each individual navigation solution 36 independently, where each navigation module 34 determines a corresponding individual navigation solution 36 in parallel. Thus, it is at level 3 where the individual level 2 results are combined in order to isolate a fault condition that may not be possible at level 2.

Referring back to FIG. 1, the third level (level 3) of fault management shall now be described. The third level of fault management involves a voting process that isolates the fault condition to one or more specific sensors 20, 30. The voting process is performed when one or more sensors 20, 30 that are the source of the fault condition are not isolated at the second level (level 2) of fault detection. Accordingly, the level 3 of fault management only involves isolation and response of the fault condition, and not detection or containment. The plurality of individual navigation solutions 36 and the indicator 105 determined by each navigation module 34 are sent to the voting module 38. The voting module 38 is configured to perform the third level of fault isolation to determine a faulty sensor 20, 30 based on a voting process. Specifically, the voting module 38 is configured to compare the individual indicators 105 corresponding to each subset 28 of sensors 20, 30 and isolate the fault condition based on the comparison of the individual indicators. Specifically, the voting module 38 isolates the fault condition by identifying a faulty sensor 20, 30 that the fault condition originates from. The voting module 38 determines the faulty sensor 20, 30 based on the comparison of the individual indicators 105, where each sensor 20, 30 is excluded from only one of the subsets 28 of sensors 20, 30.

For example, referring to FIGS. 1 and 3, in one embodiment each sensor 20, 30 that is part of the PNT system 10 is excluded from one of the subsets 28 of sensors 20, 30. Accordingly, when the voting module 38 compares the indicators 105 between each subset 28 of sensors 20, 30 (FIG. 3), then all but one of the subsets 28 of sensors 20, 30 indicate a fault condition. Specifically, the subset 28 of sensors 20, 30 that excludes the faulty sensor is the only subset 28 of sensors 20, 30 that does not include the indicator 105. For example, in the embodiment as shown in FIG. 3, if there were a fault condition with sensor 1, then each subset 28 of sensors 20, 30 would indicate a fault condition except for the fifth subset 28 of sensors 20, 30. Accordingly, the voting module 38 generates a fault signal 112 identifying the faulty sensor 20, 30.

Referring to FIG. 1, the voting module 38 sends the fault signal 112 to the fault analysis module 41. The fault analysis module 41 is also in electronic communication with the network monitoring module 42. As explained below, the network monitoring module 42 performs the fourth level (level 4) of fault management by detecting an external fault related to one or more GNSS satellites 130, 132 (FIG. 5) that are in wireless communication with the PNT system 10. The fourth level (level 4) of fault detection is performed independently with respect to the remaining three levels of fault detection and is often performed by external entities geographically distributed with a network communication with the disclosed PNT system 10 or, alternatively, another PNT user of interest.

Referring to FIGS. 1 and 5, the fourth level (level 4) of fault detection management shall now be described. As seen in FIG. 5, the network monitoring module 42 of the PNT system 10 is in wireless communication with the one or more monitoring systems 44 by the communication network 46. In the non-limiting embodiment as shown in FIG. 5, three monitoring systems 44A, 44B, and 44C are shown, however, it is to be appreciated that the network monitoring module 42 may be in wireless communication with any number of monitoring systems 44. As explained below, the disclosed network module 42 determines if one or more external sources 128 have been compromised. In the embodiment as shown in FIG. 5, the one or more external sources 128 include the satellites 130, 132. The one or more external sources 128 are compromised in response to one or more of the following: an external fault, jamming of signals transmitted or received by the one or more satellites, and spoofing of the signals transmitted or received by the one or more satellites.

It is to be appreciated that the monitoring systems 44 may be remotely situated from the PNT system 10. Each monitoring system 44 is located in a known position at a specific time and includes a corresponding GNSS receiver 124. Furthermore, each monitoring system 44 is in wireless communication with one or more satellites 130, 132, where the satellites 130, 132 include GNSS satellites 130 as well as pseudolites 132. Thus, the PNT system 10 is in wireless communication with one or more satellites 130 via the communication network 46. Each monitoring system 44 is configured to determine a measured pseudo range for each satellite 130, 132, where the measured pseudo range represents a distance between the corresponding monitoring system 44 and a particular satellite 130, 132. Specifically, a corresponding monitoring system 44 determines the measured pseudo range for a particular satellite 130, 132 based on the known position of the corresponding monitoring system 44 at the specific time and ephemeris data related to the particular satellite 130, 132. The ephemeris data indicates the trajectory of the particular satellite 130, 132, which is represented as position over time. The ephemeris data is sent from a particular satellite 130, 132 to the monitoring systems 44 over the communication network 46.

The particular monitoring system 44 also receives data representing the actual pseudo range between the monitoring system 44 and the particular satellite 130, 132 from one or more external sources (not illustrated). It is to be appreciated that the actual pseudo range represents an actual distance between the corresponding monitoring system 44 and a particular satellite 130, 132. The monitoring system 44 sends the measured pseudo range as determined based on the ephemeris data from the particular satellite 130, 132 and the actual pseudo range as determined by the one or more external sources over the communication network 46 to the network monitoring module 42. The network monitoring module 42 receives as input the measured pseudo range and the actual pseudo range and determines a difference between the measured pseudo range and the actual pseudo range. The network monitoring module 42 compares the difference between the measured pseudo range and the actual pseudo range with a predetermined maximum error value.

In response to determining the difference between the measured pseudo range and the actual pseudo range is greater than the predetermined maximum error value, the network monitoring module 42 determines the particular satellite 130, 132 has experienced an external fault. The external fault may be caused by any number of issues. For example, the external fault may be caused by errors in the ephemeris data, errors in the time data, or because the ephemeris data relates to another satellite 130, 132. In another embodiment, the external fault external threat represents a jamming or spoofing of GNSS signals, which cause the GNSS signals to indicate inaccurate data. In response to determining the particular satellite 130, 132 has experienced the external fault, the network monitoring module 42 then sends a message 50 to various platforms 52 that are part of the user 12. The various platforms 52 then determine whether or not to utilize certain resources. For example, in one embodiment, one resource that may be used is collaborative PNT. That is, in an embodiment the PNT system 10 is part of a collaborative PNT system 120 including two or more collaborative PNTs that are in wireless communication with one another.

The network module 42 is notified when the signals transmitted or received by the satellites 130, 132 are jammed or spoofed, where the notification may be sent by one of the monitoring systems 44 that are part of the communication network 46. Jamming refers to intentional interference, which is the deliberate radiation of electromagnetic signals at GNSS frequencies. In contrast, spoofing refers to the generation and transmission of false GNSS signals, with the aim to lead a GNSS receiver astray, possibly without the GNSS receiver being aware of the attack.

In an embodiment, the network module 42 also receives advisory information related to the communication network 46. For example, the advisory information indicates the presence of nearby potential network-collaborative PNT systems 120 and their resource levels. Resource levels indicate the availability of other complementary sources. Accordingly, in response to determining a particular satellite 130, 132 has been compromised, the network module 42 performs one or more corrective actions. The corrective actions include, but are not limited to, taking specific sensors 20, 30 that are part of the PNT system 10 (FIG. 1) offline, modifying the sensor combination of one or more subsets 28 of sensors, enable network-collaborative PNT, determine and mark specific GNSS sources as invalid, and disable or turn off specific PNT resources that may be cost-prohibitive to operate.

Figure 6A:
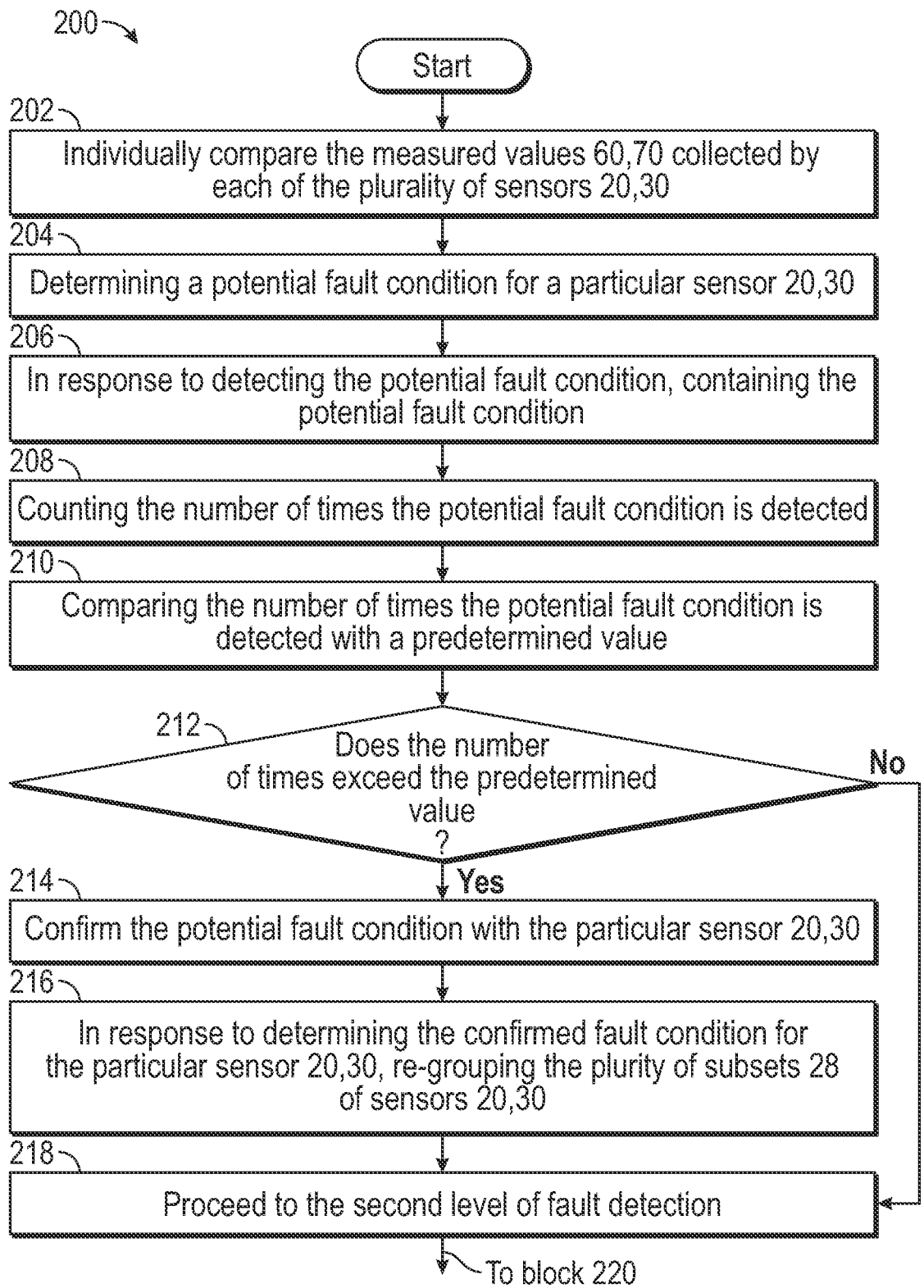
FIGS. 6A-6C illustrate a process flow diagram illustrating a method for managing fault conditions in the PNT system, according to an exemplary embodiment.
Figure 6B:
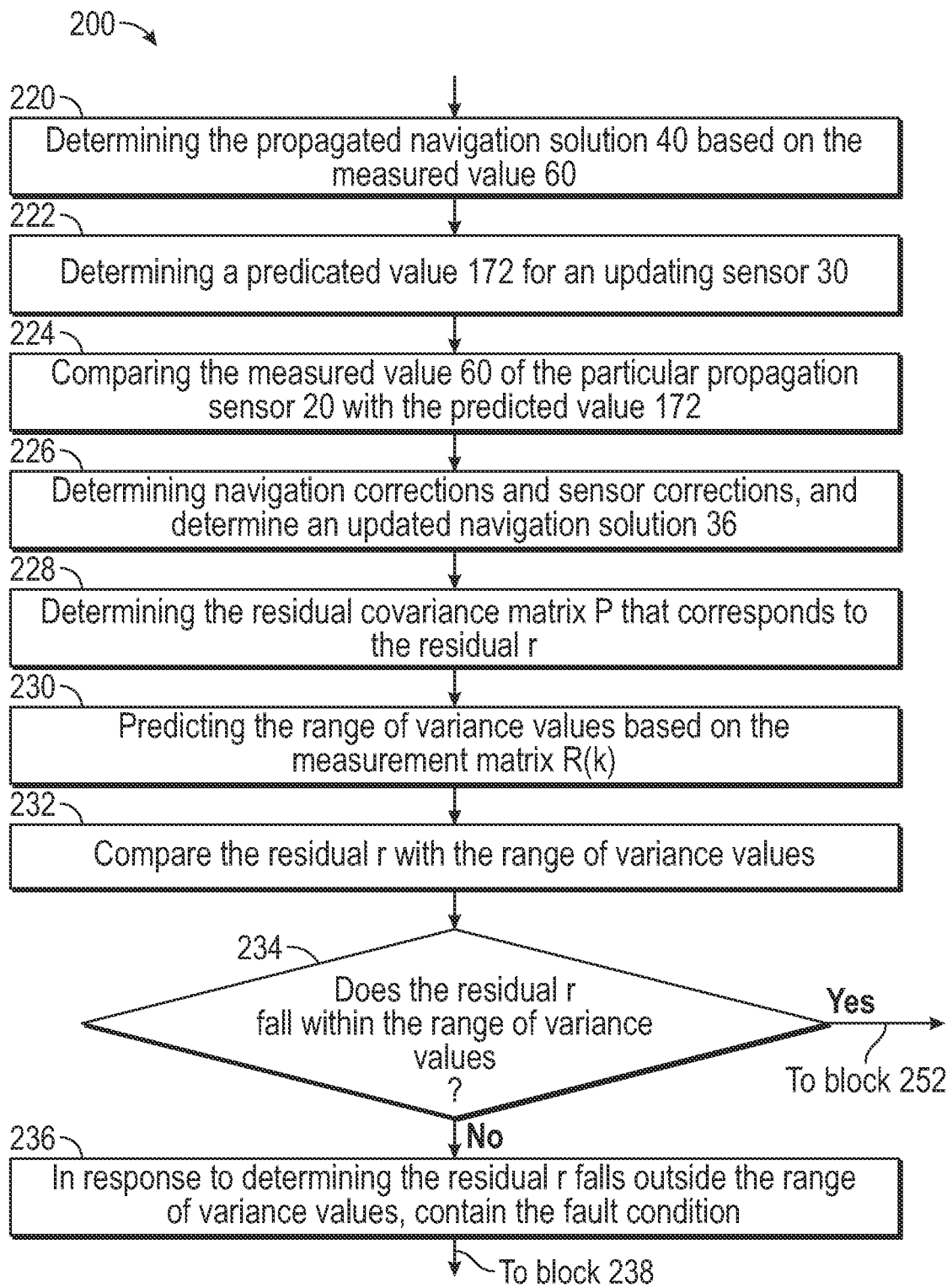
Figure 6C:
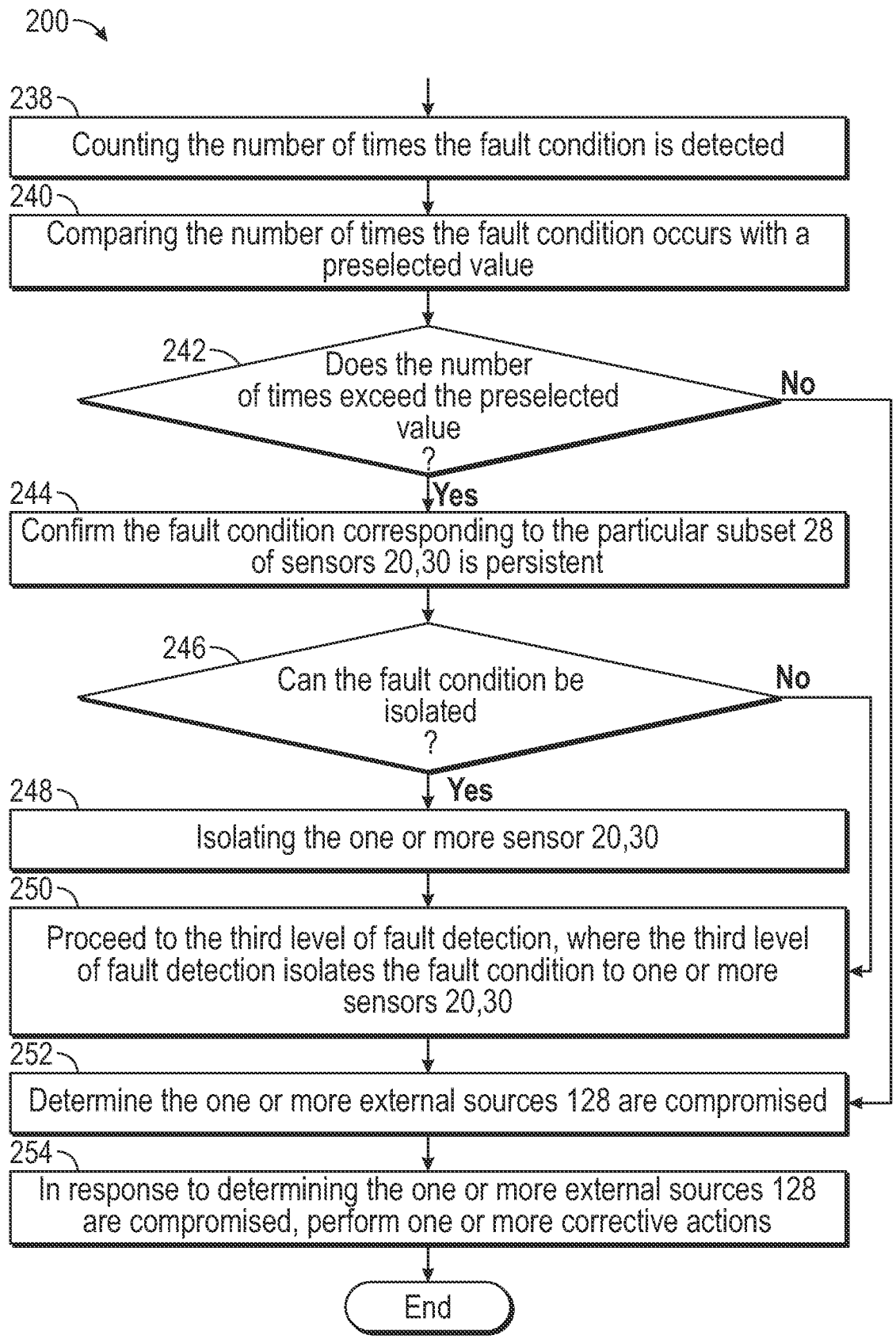

FIGS. 6A-6C illustrate an exemplary process flow diagram illustrating a method 200 for managing a fault condition for the PNT system 10 shown in FIG. 1. Referring generally to FIGS. 1, 2, and 6A, the method begins at block 202, which begins with the first level (level 1) of fault detection. In block 202, the sensor abstraction/processing modules 22, 32 individually compare the measured value 60, 70 collected by each of the plurality of sensors 20, 30 with the corresponding threshold value 80 (seen in FIG. 2) to detect the fault condition for a particular sensor 20, 30, where the measured values 60, 70 are compared individually at the first level of fault detection. The method 200 may then proceed to block 204.

In block 204, one of the sensor abstraction/processing modules 22, 32 determine a potential fault condition for a particular sensor 20, 30 exists when the measured value 60, 70 exceeds the corresponding threshold value 80 (FIG. 2). Specifically, as seen in FIG. 2, the comparator 74 generates the signal 84 in response to determining the measured value 60, 70 exceeds the corresponding threshold value 80. The method 200 may then proceed to block 206.

In block 206, in response to detecting the potential fault condition, the containment block 78 (FIG. 2) contains the potential fault condition by determining a replacement value 160, 170. The method 200 may then proceed to block 208.

In block 208, the persistency counter 76 (FIG. 2) counts the number of times that the potential fault condition is detected. The method 200 may then proceed to block 210.

In block 210, the persistency counter 76 compares the number of times the potential fault condition is detected with a predetermined value. The potential fault condition is persistent when the number of times the signal 84 is generated exceeds the predetermined value. The method 200 may then proceed to block 212.

In decision block 212, if the number of time the potential fault condition is detected does not exceed the predetermined value, then the method 200 may proceed to block 218. However, in response to determining the number of times the potential fault condition is detected exceeds the predetermined value, the method 200 proceed to block 214. In block 214, the persistency counter 76 determines the presence of the confirmed fault condition for the particular sensor 20, 30. Specifically, as seen in FIG. 2, the persistency counter 76 generates the signal 86, which provides a confirmation that the potential fault condition is persistent. The method 200 may then proceed to block 216.

In block 216, in response to determining the confirmed fault condition for the particular sensor 20, 30, the plurality of subsets 28 of sensors 20, 30 are re-grouped. As mentioned above, in one example, if a redundant sensors exists, then the redundant sensor may be used in the place of a faulty sensor 20, 30. Alternatively, if no redundant sensor exists, then a combination of sensors 20, 30 that are configured to determine an individual navigation solution 36 are used instead. The method 200 may then proceed to block 218, which is shown in FIG. 6B.

In block 218, the method 200 proceeds to the second level of fault detection, where the second level of fault detection includes determining a plurality of individual navigation solutions 36 corresponding to each of the plurality of subsets of sensors 20, 30, where each individual navigation solution 36 is based on a corresponding subset 28 of sensors 20, 30. As mentioned above, each navigation module 34 (seen in FIG. 1) corresponds to a subset 28 of sensor 20, 30. Accordingly, there as many individual navigation solutions 36 are there are navigation modules 34. The method 200 may then proceed to block 220.

In block 220, the inertial navigation block 88 (FIG. 4) that is part of each navigation module 34 (FIG. 1) determines the propagated navigation solution 40 based on the measured value 60 from the particular propagating sensor 20. As mentioned above, the particular propagating sensor 20 is part of a plurality of sensors 20, 30 that correspond to a particular subset 28 of sensors 20, 30 as well as a specific navigation module 34. The method 200 may then proceed to block 222.

In block 222, the prediction block 90 (FIG. 4) determines a predicted value 172 for an updating sensor 30 based on the propagated navigation solution 40 and a mathematical model. As mentioned above, the updating sensor 30 is part of the particular subset 28 of sensors that correspond to a specific navigation module 34 (FIG. 1). The method 200 may then proceed to block 224.

In block 224, the residual block 92 (FIG. 4) compares the measured value 60 of the particular update sensor 30 with the predicted value 172 to determine the residual r. The residual block 92 also determines the plurality of pre-Kalman filter processing values that correspond to the particular subset 28 of sensors 20, 30. The method 200 may then proceed to block 226.

In block 226, the Kalman filter 96 (FIG. 4) determines navigation corrections and sensor corrections for the propagating sensor 20 and the updating sensors 30 based on the pre-Kalman filter processing values. The Kalman filter 96 determines an individual navigation solution 36 that corresponds to the particular subset 28 of sensors 20, 30 by updating the propagated navigation solution 40 with the navigation corrections and the sensor corrections. The method 200 may then proceed to block 228.

In block 228, the residual covariance block 94 determines the residual covariance matrix P that corresponds to the residual r. The method 200 may then proceed to block 230.

In block 230, the residual covariance bounding block 98 predicts the range of variance values based on the measurement variance matrix R(k). As mentioned above, the measurement variance matrix R(k) is one of the pre-Kalman processing values. The method 200 may then proceed to block 232.

In block 232, the residual covariance bounding block 98 compares the residual r with the range of variance values. The method 200 may then proceed to decision block 234.

In decision block 234, if the residual r falls within the range of variance values, then the method 200 proceeds to block 252 in FIG. 6B. However, in response to determining the residual r falls outside of the range of variance values, the method 200 proceeds to block 236. In block 236, the fault condition corresponding to the particular subset 28 of sensors 20, 30 is contained. The method 200 may then proceed to block 238, which is shown in FIG. 6C.

In block 238, the persistency counter 100 (shown in FIG. 4) counts the number of times that the fault condition is detected. The method then proceeds to block 240.

In block 240, the persistency counter 100 compares the number of times the fault condition occurs with a preselected value. The method 200 may then proceed to decision block 242.

In decision block 242, the persistency counter 100 determines if the number of times the fault condition occurs exceeds the preselected value. If the answer is no, then the method 200 proceeds to block 250. In response to determining the number of times the fault condition corresponding to the particular subset of sensors is detected exceeds the preselected value, the method proceeds to block 244. In block 244, the persistency counter 100 confirms the fault condition corresponding to the particular subset 28 of sensors 20, 30 is persistent. The method 200 may then proceed to decision block 246.

In decision block 246, if it is possible to isolate the fault condition, then the method 200 proceeds to block 248. In block 248, the isolation and response block 102 isolates one or more sensors 20, 30 that are the source of the fault condition for the particular subset 28 of sensors 20, 30. However, sometimes it may not be possible to isolate the fault condition. Accordingly, the method 200 may proceed to block 250.

In block 250, in response to determining the fault condition corresponding to the particular subset 28 of sensors 20 is persistent, the method 200 proceeds to the third level (level 3) of fault detection. As explained above, the third level (level 3) of fault detection involves the voting process for isolating the fault condition to one or more sensors 20, 30. The method 200 may then proceed to block 252, which explains the fourth level (level 4) of fault detection.

It is to be appreciated that the fourth level (level 4) of fault detection may be performed separately and independently from the other three remaining levels of fault detection. In block 252, the network monitoring module 42 determines that the one or more external sources 128 (FIG. 5) are compromised. In the embodiment as shown in FIG. 5, the external sources include the satellites 130, 132. As mentioned above, the external sources 128 are compromised in response to one of the following: an external fault, jamming of signals transmitted or received by one or the external sources, and spoofing of the signals transmitted or received by the one or more external sources. The method 200 may then proceed to block 254.

In block 254, in response to determining one or more external sources 128 are compromised, perform one or more corrective actions. As mentioned above, the corrective actions include taking specific sensors 20, 30 that are part of the PNT system 10 (FIG. 1) offline, modifying the sensor combination of one or more subsets 28 of sensors, enable network-collaborative PNT, determine and mark specific GNSS sources as invalid, and disable or turn off specific PNT resources that may be cost-prohibitive to operate. The method 200 may then terminate.

Referring generally to the figures, the present disclosure provides various technical effects and benefits. Specifically, the present disclosure is directed towards a PNT system that includes four separate levels of fault management architecture that allows for to detect, contain, isolate, and respond to a fault condition. Therefore, if one or more sensors generate a fault, the disclosed fault architecture prevents the fault condition from propagating through the PNT system. In addition to preventing the fault condition originating from one or more sensors from propagating throughout the PNT system, the disclosure also provides an approach detecting external faults, which may be caused by jamming, spoofing, or by errors in the data derived from the GNSS signals.

Figure 7:
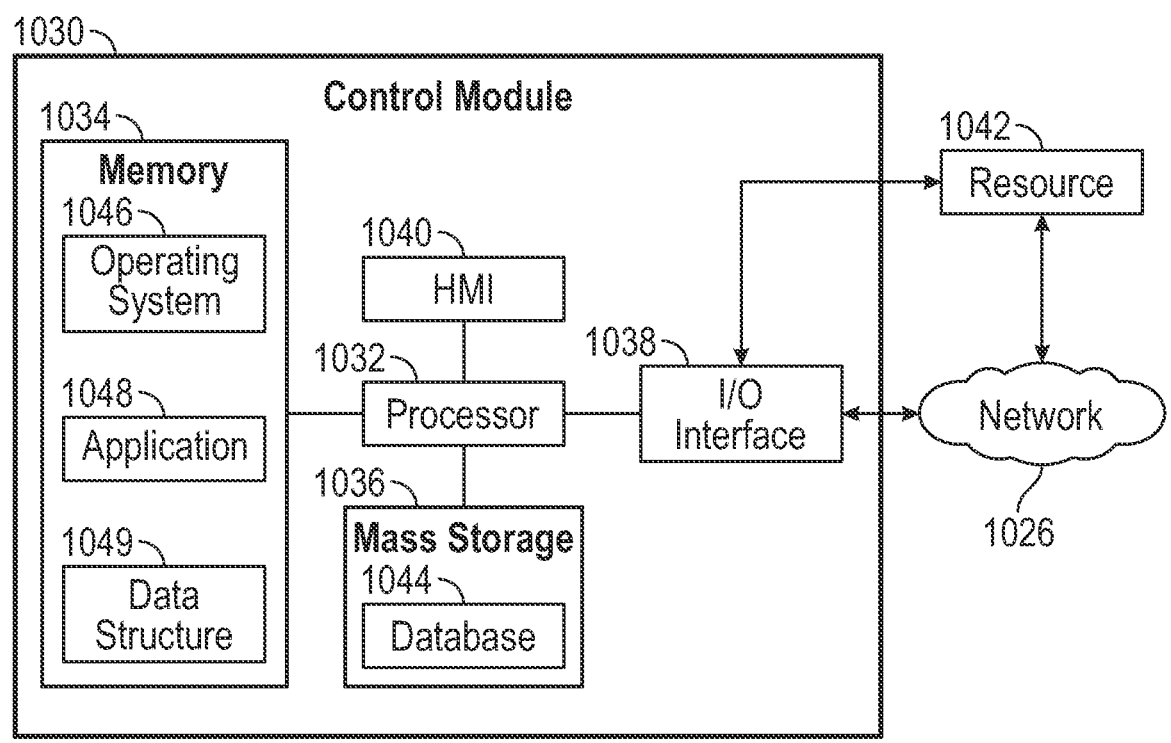
FIG. 7 is the computing system for the disclosed PNT system, according to an exemplary embodiment.

Referring to FIG. 7, the PNT system 10 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A position, navigation, and timing (PNT) system for a vehicle, comprising:
    a plurality of sensors configured to collect physical measurements related to the vehicle, wherein the plurality of sensors are grouped into a plurality of subsets of sensors, each subset of sensors including a plurality of propagating sensors, each propagating sensor of the plurality of propagating sensors comprising an inertial measurement unit coupled to the vehicle, wherein each propagating sensor of the plurality of propagating sensors is configured to collect measured values associated with one or more of the following vehicle variables: a change of position of the vehicle, a change of velocity of the vehicle, and a change of attitude of the vehicle;
    one or more processors in electronic communication with the plurality of sensors; and
    a memory coupled to the one or more processors, the memory storing data into one or more databases and program code that, when executed by the one or more processors, causes the PNT system to:
        repeatedly determine a plurality of individual navigation solutions of the vehicle using the measured values collected by the plurality of subsets of sensors, wherein determining each individual navigation solution of the plurality of individual navigation solutions comprises determining a current position, a current velocity, and a current attitude of the vehicle at a specific time based on the measured values collected by a corresponding subset of sensors of the plurality of subsets of sensors;
        while repeatedly determining the plurality of individual navigation solutions of the vehicle, performing a first level of fault detection, wherein performing the first level of fault detection includes:
            continuously monitoring the measured values collected by each propagating sensor of the plurality of propagating sensors;
            detecting a potential fault condition for a particular propagating sensor of the plurality of propagating sensors in response to a respective measured value collected by the particular propagating sensor exceeding a corresponding threshold value;
            in response to detecting the potential fault condition for the particular propagating sensor, determining a replacement value for the respective measured value;
            replacing the respective measured value that exceeds the corresponding threshold value with the replacement value, such that one or more of the individual navigation solutions of the vehicle are determined using the replacement value in place of the respective measured value to prevent the potential fault condition from propagating throughout the PNT system;
            tracking a number of times that the potential fault condition is detected for the particular propagating sensor;
            in response to the number of times that the potential fault condition is detected exceeding a predetermined value, determining a confirmed fault condition for the particular propagating sensor; and
            in response to determining the confirmed fault condition for the particular propagating sensor, taking the particular propagating sensor offline and re-grouping the plurality of subsets of sensors to form a plurality of re-grouped subsets of sensors excluding the particular propagating sensor; and
        in response to re-grouping the plurality of subsets of sensors, continuing to repeatedly determine the plurality of individual navigation solutions of the vehicle using the measured values collected by the plurality of re-grouped subsets of sensors in place of the plurality of subsets of sensors; and
        while continuing to repeatedly determine the plurality of individual navigation solutions of the vehicle using the measured values collected by the plurality of re-grouped subsets of sensors, performing a second level of fault detection, wherein performing the second level of fault detection includes determining whether a subset fault condition is associated with one or more of the re-grouped subsets of sensors.

2. The PNT system of claim 1, wherein each re-grouped subset of sensors further comprises at least one updating sensor configured to collect measurement values related to one or more of a position, a velocity, and an attitude of the vehicle, and wherein the one or more processors execute instructions to:
determine a propagated navigation solution of the vehicle based on the measured values collected by the plurality of propagating sensors of a particular re-grouped subset of sensors, wherein the propagated navigation solution includes a time sequence of a changing position, a changing velocity, and a changing attitude of the vehicle;
determine a predicted measurement value for a first updating sensor of the particular re-grouped subset of sensors based on the propagated navigation solution; and
compare an actual measurement value collected by the first updating sensor with the predicted measurement value to determine a residual.

3. The PNT system of claim 2, wherein the one or more processors execute instructions to:
determine a plurality of pre-Kalman filter processing values that correspond to the particular re-grouped subset of sensors;
determine navigation corrections and sensor corrections for the first updating sensor and the plurality of propagating sensors of the particular re-grouped subset of sensors based on the plurality of pre-Kalman filter processing values; and
determine a respective individual navigation solution that corresponds to the particular re-grouped subset of sensors by updating the propagated navigation solution with the navigation corrections and the sensor corrections.

4. The PNT system of claim 3, wherein the one or more processors execute instructions to:
determine a residual covariance matrix that corresponds to the residual;
predict a range of variance values based on a measurement variance matrix, wherein the measurement variance matrix is one of the plurality of pre-Kalman filter processing values;
compare the residual with the range of variance values; and
in response to determining the residual falls outside of the range of variance values, determine the subset fault condition is detected for the particular re-grouped subset of sensors.

5. The PNT system of claim 4, wherein in response to detecting the subset fault condition for the particular re-grouped subset of sensors, the one or more processors execute instructions to:
contain the subset fault condition corresponding to the particular re-grouped subset of sensors by skipping the measured values and the measurement values collected by the particular re-grouped subset of sensors for a particular sample time.

6. The PNT system of claim 4, wherein the one or more processors execute instructions to:
count a number of times that the subset fault condition is detected;
compare the number of times the subset fault condition corresponding to the particular re-grouped subset of sensors is detected; and
in response to determining the number of times the subset fault condition corresponding to the particular re-grouped subset of sensors is detected exceeds a preselected value, confirm the subset fault condition corresponding to the particular re-grouped subset of sensors is persistent.

7. The PNT system of claim 6, wherein the one or more processors execute instructions to:
isolate one or more sensors that are a source of the subset fault condition for the particular re-grouped subset of sensors by taking the one or more sensors that are the source of the subset fault condition offline.

8. The PNT system of claim 6, wherein the one or more processors execute instructions to:
in response to determining the subset fault condition corresponding to the particular re-grouped subset of sensors is persistent, proceed to a third level of fault detection, wherein the third level of fault detection involves a voting process for isolating the subset fault condition to one or more sensors.

9. The PNT system of claim 8, wherein one or more sensors that are a source of the subset fault condition are not isolated at the second level of fault detection.

10. The PNT system of claim 3, wherein the plurality of pre-Kalman filter processing values include one or more of the following: the residual, a measurement sensitivity matrix, and a measurement variance matrix.

11. The PNT system of claim 10, wherein the one or more processors execute instructions to:
determine an error covariance matrix that corresponds to the residual based on the measurement variance matrix.

12. The PNT system of claim 11, wherein the one or more processors execute instructions to:
predict a range of variance values based on the error covariance matrix;
compare the residual with the range of variance values, wherein the range of variance values are inversely proportional to an uncertainty of the residual; and
in response to determining the residual falls outside of the range of variance values, containing a fault condition corresponding to the particular re-grouped subset of sensors.

13. The PNT system of claim 11, wherein a range of variance values of the residual are expressed as:

$$|\text{residual } r_k| < \text{factor} * \sqrt{\text{varianceofresidual} r_k} \qquad \text{Equation 1}$$

$$(\text{residual } r_k)^2 < \text{factor}^2 * (\text{variance of residual } r_k) \qquad \text{Equation 2}$$

wherein r represents the residual, k is an index into a residual vector, Equation 1 is equivalent to Equation 2, and factor represents a confidence factor having a value greater than three.

14. The PNT system of claim 1, wherein the vehicle is an automobile, an aircraft, an unmanned aerial vehicle (UAV), a helicopter, a missile, a marine vehicle, an unmanned underwater vehicle (UUV), or an unmanned ground vehicle (UGV).

15. The PNT system of claim 1, wherein the replacement value is determined using a predictive model based on previously collected measured values.

16. The PNT System of claim 1, wherein the one or more processors are further configured to communicate the plurality of individual navigation solutions to a control system of the vehicle, wherein the plurality of individual navigation solutions are utilized by the control system to determine a motion path of the vehicle.

17. A method for managing a fault condition for a PNT system of a vehicle, the method comprising:
repeatedly determining, by a computer of the PNT system, a plurality of individual navigation solutions for the vehicle, wherein determining each individual navigation solution includes determining a current position, a current velocity, and a current attitude of the vehicle based on measured values collected by a corresponding subset of sensors of a plurality of subsets of sensors of the PNT system, wherein the PNT system comprises a plurality of sensors configured to collect physical measurements related to the vehicle, wherein the plurality of sensors are grouped into the plurality of subsets of sensors, each subset of sensors including a plurality of propagating sensors, each propagating sensor of the plurality of propagating sensors comprising an inertial measurement unit coupled to the vehicle, wherein each propagating sensor of the plurality of propagating sensors is configured to collect the measured values, and wherein the measured values collected by each propagating sensor of the plurality of propagating sensors are associated with one or more of the following vehicle variables: a change of position of the vehicle, a change of velocity of the vehicle, and a change of attitude of the vehicle;
while repeatedly determining the plurality of individual navigation solutions for the vehicle, performing, by the computer, a first level of fault detection, wherein performing the first level of fault detection includes:
continuously monitoring the measured values collected by each propagating sensor of the plurality of propagating sensors;
individually comparing a respective measured value collected by each of the plurality of propagating sensors with a corresponding threshold value by the computer, wherein the measured values are compared individually at the first level of fault detection;
detecting, by the computer, a potential fault condition for a particular propagating sensor of the plurality of propagating sensors in response to the respective measured value collected by the particular propagating sensor exceeding the corresponding threshold value;
in response to detecting the potential fault condition, determining a replacement value for the respective measured value;
replacing the respective measured value that exceeds the corresponding threshold value with the replacement value, such that one or more of the individual navigation solutions are determined using the replacement value in place of the respective measured value to prevent the potential fault condition from propagating throughout the PNT system;
tracking a number of times that the potential fault condition is detected for the particular propagating sensor;
in response to determining the number of times that the potential fault condition is detected exceeds a predetermined value, determining a confirmed fault condition for the particular propagating sensor;
in response to determining the confirmed fault condition for the particular propagating sensor, taking the particular propagating sensor offline and re-grouping the plurality of subsets of sensors to form a plurality of re-grouped subsets of sensors excluding the particular propagating sensor; and
in response to re-grouping the plurality of subsets of sensors, continuing to repeatedly determine the plurality of individual navigation solutions for the vehicle using the measured values collected by the plurality of re-grouped subsets of sensors in place of the plurality of subsets of sensors; and
while repeatedly determining the plurality of individual navigation solutions for the vehicle using the measured values collected by the plurality of re-grouped subsets of sensors, performing a second level of fault detection, wherein performing the second level of fault detection includes determining whether a subset fault condition is associated with one or more of the re-grouped subsets of sensors.

18. The method of claim 17, further comprising:
determining a propagated navigation solution based on the measured values collected by the plurality of propagating sensors of a particular re-grouped subset of sensors, wherein the propagated navigation solution includes a time sequence of a changing position, a changing velocity, and a changing attitude of the vehicle, and wherein the particular re-grouped subset of sensors comprises at least a first updating sensor configured to collect measurement values related to one or more of a position, a velocity, and an attitude of the vehicle;
determining a predicted measurement value for the first updating sensor based on the propagated navigation solution; and
comparing an actual measurement value collected by the first updating sensor with the predicted measurement value to determine a residual.

19. The method of claim 18, further comprising:
determining a plurality of pre-Kalman filter processing values that correspond to the particular re-grouped subset of sensors;
determining navigation corrections and sensor corrections for the first updating sensor and the plurality of propagating sensors of the particular re-grouped subset of sensors based on the plurality of pre-Kalman filter processing values; and
determining a respective individual navigation solution that corresponds to the particular re-grouped subset of sensors by updating the propagated navigation solution with the navigation corrections and the sensor corrections.

20. The method of claim 19, further comprising:
determining a residual covariance matrix that corresponds to the residual;
predicting a range of variance values based on a measurement variance matrix, wherein the measurement variance matrix is one of the plurality of pre-Kalman filter processing values;
comparing the residual with the range of variance values; and
in response to determining the residual falls outside of the range of variance values, determining the subset fault condition is detected for the particular re-grouped subset of sensors.

21. The method of claim 20, further comprising containing the fault condition corresponding to the particular re-grouped subset of sensors by skipping the measured values and the measurement values collected by the particular re-grouped subset of sensors for a particular sample time.

22. The method of claim 17, wherein the vehicle is an automobile, an aircraft, an unmanned aerial vehicle (UAV), a helicopter, a missile, a marine vehicle, an unmanned underwater vehicle (UUV), or an unmanned ground vehicle (UGV).

* * * * *